June 20, 1961

W. H. CLEVERDON 2,989,118

METHODS FOR VAPORIZING AND COMBUSTING
VOLATILE LOWER HYDROCARBONS

Filed March 27, 1957

William H. Cleverdon
INVENTOR.

BY Robert Paty
ATTY

United States Patent Office 2,989,118
Patented June 20, 1961

2,989,118
METHODS FOR VAPORIZING AND COMBUSTING VOLATILE LOWER HYDROCARBONS
William H. Cleverdon, 2121 W. 5th St., Stillwater, Okla.
Filed Mar. 27, 1957, Ser. No. 648,962
2 Claims. (Cl. 158—117.5)

The present invention relates to methods for vaporizing and combusting volatile lower hydrocarbons, and more particularly to such methods when used to fire drying or heating chambers.

In the past, several methods have been used for vaporizing and combusting volatile lower hydrocarbonaceous fuels for firing such devices. For example, batch vaporizers have in the past been used, which utilized a battery of storage tanks of sufficient capacity to allow vaporization by ambient heat. However, a batch vaporization has proven unsatisfactory for low ambient temperature operation, as a large number of storage tanks were required for ambient heat flow to vaporize the fuel. Thus, batch vaporization installations have been quite expensive.

As another example, small, separately fired, self-contained unit vaporizers, manifolded together, have been used. However, such unit vaporizers have also proven unsatisfactory, as a plurality of units are required to vaporize any substantial quantity of fuel; and the costs of installation and operation have again been excessive.

Although many other attempts were made to overcome the above and other difficulties and disadvantages, none, as far as I am aware, was entirely successful when carried out commercially on an industrial scale.

Accordingly, it is an object of my invention to provide methods for vaporizing and combusting volatile lower hydrocarbons, which will have relatively high vaporizing and combusting capacities per unit.

Another object of the present invention is the provision of methods for vaporizing and combusting volatile lower hydrocarbons, in which the cost of operation and intricacy of the equipment will be reduced by utilizing heat generated by the normal operation of the machine and practice of the method.

A still further object of my invention is the provision of methods for vaporizing and combusting volatile lower hydrocarbons, in which vaporization is conducted in two stages, thereby to assure complete vaporization with relatively simple and inexpensive apparatus.

Yet another object of my invention is the provision of methods for vaporizing and combusting volatile lower hydrocarbons, in which complete vaporization is achieved at higher operating pressures than were obtainable by the use of methods according to the prior art.

Other objects and advantages of the present invention will become apparent from a consideration of the following description, taken in conjunction with the accompanying drawings, in which.

Figure 1:
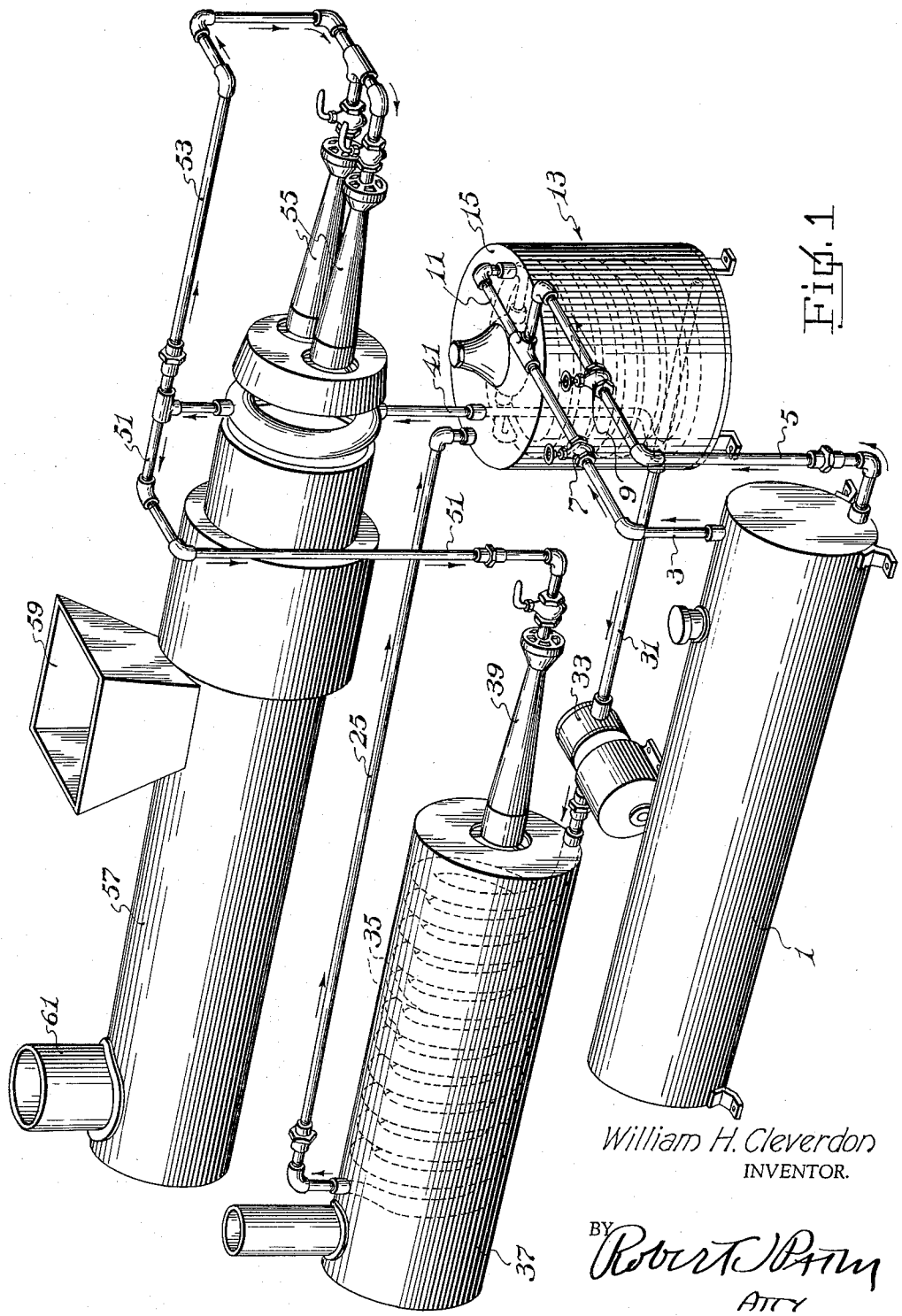
FIGURE 1 is a perspective schematic representation of apparatus adapted to carry out the present invention, with parts shown in phantom line and with the directions of flow indicated for greater clarity.
Figure 2:
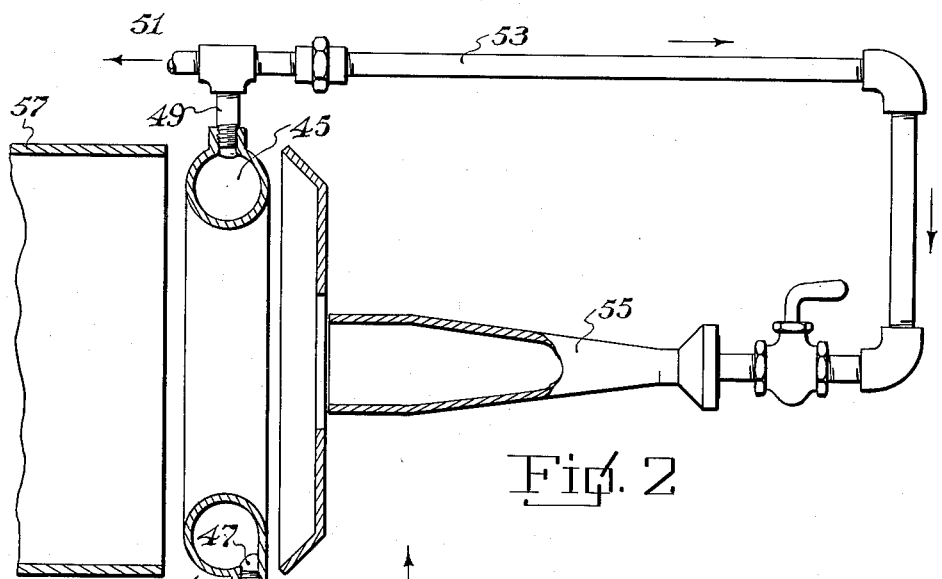
FIGURE 2 is an elevational fragmentary view of the second stage vaporizer forming a portion of the apparatus adapted to carry out the present invention, with parts broken away for clarity.
Figure 3:
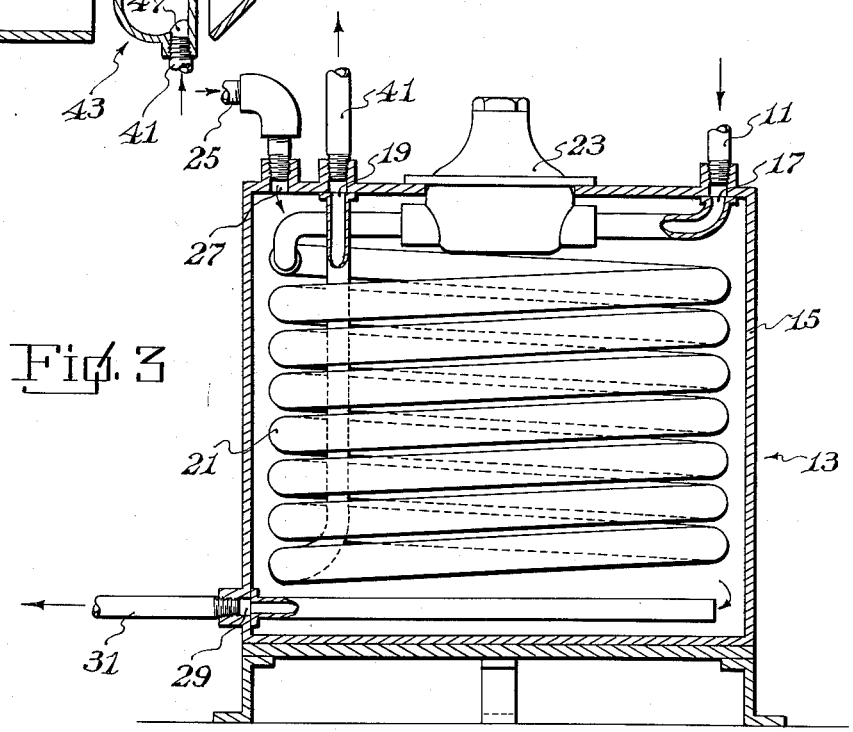
FIGURE 3 is an elevational fragmentary cross-sectional view of the first stage vaporizer forming a portion of the apparatus adapted to carry out the present invention, with parts broken away for clarity.

Referring now to the drawings in greater detail, there is shown a storage container 1 in which is disposed a body of volatile lower hydrocarbons under positive pressure in two-phase relationship, there being a vapor phase and a liquid phase with a single vapor-liquid interface therebetween. The pressure at which the contents of container 1 are maintained is substantially higher than atmospheric, and may, for example, be 25 to 80 lbs. gauge pressure for butane, or 25 to 180 lbs. gauge pressure for propane, butane and propane being the most important lower hydrocarbons from a commercial standpoint for purposes of this invention.

Leading from the top of container 1 is a vapor phase outlet conduit 3; and leading from the bottom of container 1 is a liquid phase outlet conduit 5. Conduits 3 and 5 are selectively opened or closed by valves 7 and 9, respectively. Conduits 3 and 5 merge into an inlet conduit 11 leading to the first stage vaporizer indicated generally at 13.

Vaporizer 13 is comprised of a closed tank 15 having a hydrocarbon inlet at 17 and a hydrocarbon outlet at 19, both extending through the upper wall thereof, both being joined by a continuous coil 21 which spirals down through tank 15 and terminates in an upwardly extending riser connecting with outlet 19. A conventional pressure regulator 23 is disposed adjacent the beginning of coil 21 toward the upstream end thereof; and a major portion of regulator 23 is disposed within vaporizer 13 to prevent liquefaction of the hydrocarbons on the parts thereof. Regulator 23 may be of any of the conventional forms in which a gas stream or liquid stream performs work on moving parts of the regulator thereby to reduce the pressure of the stream.

Heat is supplied to the first stage vaporizer by a heat exchange fluid comprising hot process oil or steam supplied through a fluid inlet conduit 25, through a fluid inlet 27 into tank 15, past and around coil 21, and out through a fluid outlet 29 including a pipe extending horizontally across the bottom of tank 15 from the same side as inlet 27 and terminating in an open end adjacent the other side of tank 15. The heat exchange fluid then passes through fluid outlet conduit 31 in which is positioned a motor driven pump 33 to impel the fluid through its cycle, then through a heater coil 35 and back to conduit 25, whereby the fluid is continuously cyclically circulated. Coil 35 is disposed in a heater shell 37 and is axially fired by a burner 39 supplied by a fraction of the finally vaporized hydrocarbon stream, as will be explained later.

Returning now to the hydrocarbon path, a short outlet conduit 41 leads from the first stage vaporizer to the second or final stage vaporizer indicated generally at 43, and comprising an annular chamber 45 which surrounds a combustion area and is arcuate in its cross sectional configuration. Chamber 45 has a cross sectional area very substantially greater than the cross sectional area of conduit 41, so that both the pressure and velocity of the at least partially vaporized hydrocarbon passing through conduit 41 is very substantially reduced upon entry into chamber 45. Chamber 45 is supplied from below by an inlet 47 fed by conduit 41, inlet 47 being so disposed relative to chamber 45 that the stream of influent liquid and vapor is directed chordally of the arcuate cross sectional configuration of chamber 45. Of course, the cross section of chamber 45 is not restricted to circular; but the relationship of the influent stream to chamber 45 is shown in the case of a circular cross section by pointing out that the stream is not directed diametrically of the circle but is displaced from the center of the circle so as to form a chord thereof. Thus, the influent stream scavenges the side walls of chamber 45; and the direction of the stream assures that liquids entrained in the stream will impinge on the side walls of chamber 45 and be efficiently vaporized.

A short outlet nipple 49 provides the exit at the top of chamber 45 for the completely volatilized hydrocarbon stream, which is then split into two branches. One branch, which forms a minor proportion of the total stream, is conducted through first stage heater conduit 51 to burner 39, where it is combusted to provide heat for the first stage vaporizer. The other and major portion of the total hydrocarbon stream is conducted through main burner feed conduit 53 to main burners 55.

Burners 55 are directed to fire essentially axially through annular chamber 45, but not directly at chamber 45, into the fire box end of a conventional rotary drying or heating kiln 57 having a gravity feed hopper 59 and a stack 61 for combustion gases. It should particularly be noted that chamber 45 is so disposed that it is exposed over a major portion of its external area either to the flames from burners 55 or to the interior of the fire box. In this way, chamber 45 receives radiant heat from both of these sources to complete the vaporization of the hydrocarbons within chamber 45 by indirect heat exchange. It should also be noted that chamber 45 is so spaced from burners 55 and the adjacent end of kiln 57 that secondary air may pass between chamber 45 and these two adjacent structures and be heated to a desired degree by contact with chamber 45.

In operation, with valve 7 open and valve 9 closed, a portion of the vapor dome normally in container 1 is passed through the system and combusted in burners 39 and 55 to preheat the system, that is, to warm up the first and second stage vaporizers. When this has been accomplished, valve 7 is closed and valve 9 opened, whereupon the liquid phase of the hydrocarbons is sent through the system under tank pressure. In the first stage vaporizer, the liquid phase is at least partially vaporized by its travel through one of the two passages of the first stage vaporizer, in heat exchange relationship with the heat exchange fluid in the other of these two passages, the heat exchange fluid being continuously cyclically circulated and the heat of this fluid being continuously renewed through burner 39. The passage of the at least partially vaporized hydrocarbon through the relatively short conduit 41 does not allow time for liquefaction; and upon chordal introduction into chamber 45, the remaining portions of liquid phase are washed along the inner walls of chamber 45 and quickly vaporized. The totally vaporized hydrocarbon stream leaving chamber 45 is split into two unequal portions, the smaller of which feeds burner 39 and the larger of which feeds burners 55, the primary purpose of burners 55 being to heat and dry the contents of kiln 57, such as asphalt aggregates or the like, and the secondary purpose of the burners 55 being to serve as a heat source from the operation of which radiant heat will eventually be transmitted through the side walls of chamber 45 by conduction and thence to the hydrocarbon stream to complete vaporization thereof.

It should especially be noted that by providing the second stage vaporizer in combination with the first stage vaporizer, only a relatively very small proportion of the finally vaporized stream need be diverted for purposes of heating the first stage vaporizer. It should also be particularly noted that by providing the first stage vaporizer in combination with the second stage vaporizer, the stream entering the second stage vaporizer is in such a condition of partial vaporization that very large quantities of hydrocarbon may be passed through the second stage vaporizer and completely vaporized therein, so that much greater quantities of completely gaseous hydrocarbon can be obtained and usefully burned than was possible with apparatus and methods according to the prior art.

Now from a consideration of all of the foregoing, it will be obvious that I have achieved all of the initially recited objects of my invention.

Although the present invention has been described in conjunction with preferred embodiments, it is to be understood that modifications and variations may be made without departing from the spirit or scope of the invention, as those skilled in the art will readily understand. Such modifications and variations are considered to be within the purview and scope of the invention and the appended claims.

I claim:

1. A method of vaporizing and burning volatile lower hydrocarbons, comprising the steps of vaporizing a portion only of a liquid stream of volatile lower hydrocarbons by passing the stream in heat exchange relationship with a heat exchange fluid at a temperature substantially higher than the temperature of the stream, vaporizing the remaining liquid portion of the stream by passing the stream annularly about a combustion area with the remaining liquid portion moving at a substantially reduced velocity, dividing the stream into two branches, one of the branches comprising the major portion of the stream, burning said one branch in said combustion area in indirect heat exchange relationship with the stream passing annularly thereabout to heat the stream and complete the vaporization thereof, burning the other said branch adjacent said heat exchange fluid to supply heat to said heat exchange fluid, and continuously cyclically circulating said heat exchange fluid.

2. A method of vaporizing and burning volatile lower hydrocarbons, comprising the steps of vaporizing a portion only of a liquid stream of volatile lower hydrocarbons, then vaporizing the remaining liquid portion of the stream by passing the stream annularly about a combustion area with the remaining liquid portion moving at a substantially reduced velocity, dividing the stream into two branches, one of the branches comprising the major portion of the stream, burning said one branch in said combustion area in indirect heat exchange relationship with the stream passing annularly thereabout to heat the stream and complete the vaporization thereof, and supplying heat to the first vaporizing step by burning the other said branch.

References Cited in the file of this patent

UNITED STATES PATENTS

| Number | Name | Date |
|---|---|---|
| 234,468 | Graham | Nov. 16, 1880 |
| 345,649 | Roberts | July 13, 1886 |
| 591,916 | Dupee | Oct. 19, 1897 |
| 674,812 | McCormick | May 21, 1901 |
| 746,409 | Turner | Dec. 8, 1903 |
| 835,627 | Loring | Nov. 13, 1906 |
| 954,380 | Davis | Apr. 5, 1910 |
| 1,320,599 | Bonnell et al. | Nov. 4, 1919 |
| 1,639,167 | Degen | Aug. 16, 1927 |
| 1,696,389 | Debaecker | Dec. 25, 1928 |
| 1,912,243 | Andrews | May 30, 1933 |
| 2,070,209 | Kerr | Feb. 9, 1937 |
| 2,099,742 | Klesa | Nov. 23, 1937 |
| 2,329,750 | Faucher | Sept. 21, 1943 |
| 2,736,168 | Hanley | Feb. 28, 1956 |
| 2,815,019 | Keible | Dec. 3, 1957 |